US005199474A

United States Patent [19]

[11] Patent Number: 5,199,474
[45] Date of Patent: Apr. 6, 1993

D'Angelo

[54] GASOLINE PUMP ACTUATING HANDLE RETAINING MECHANISM

[75] Inventor: Anthony J. D'Angelo, Baiting Hollow, N.Y.

[73] Assignee: Pump Ball USA, Inc., Baiting Hollow, N.Y.

[21] Appl. No.: 803,490

[22] Filed: Dec. 4, 1991

[51] Int. Cl.[5] F16K 35/00; B65D 51/24

[52] U.S. Cl. 141/392; 141/1; 251/90; 273/58 R

[58] Field of Search 141/392; 251/90; 273/58 J, 58 R, 58 K

[56] References Cited

U.S. PATENT DOCUMENTS 3,079,644 3/1963 Molitor et al. 273/58 J
3,222,065 12/1965 Dwork 273/58 J
3,651,530 3/1972 Schultz 273/58 R
4,175,595 11/1979 Noe 141/1
4,201,253 5/1980 Maloney 141/392
4,278,116 7/1981 Opp 141/392
4,722,375 2/1988 Fox 141/392
4,802,516 2/1989 Dahlem 141/392

*Primary Examiner*—Ernest G. Cusick
*Attorney, Agent, or Firm*—Schweitzer Cornman & Gross

[57] ABSTRACT

A device for maintaining the operating handle of a gasoline pump nozzle is in the form of a ball dimensioned to be placed between the operating handle and the handle frame. The ball retains the handle in a dispensing position, fuel flow being terminated by the operation of the pump's automatic shut-off device. The ball preferably has a projection-bearing surface, and is slightly deformable to allow for ease of insertion and removal.

4 Claims, 1 Drawing Sheet

GASOLINE PUMP ACTUATING HANDLE RETAINING MECHANISM

The present invention relates to a new and improved device for use in connection with gasoline dispensing apparatus and, in particular, with such devices used in the "self-service" environment to allow continuous hand pressure on the dispenser nozzle to be released without terminating the fill of the tank.

BACKGROUND OF THE INVENTION

Conventional apparatus for the dispensing of gasoline and similar fuels for use in cars, trucks and the like, are of the type in which the fuel is drawn from a typically subterranean tank by a pump through a metering unit and then through the pump hose which terminates in a manually-operated nozzle. The nozzle assembly includes an actuating lever within a frame, the lever being gripped by the user's fingers to trigger a valve within the nozzle assembly.

In the past, nozzle mechanisms were often provided with a clamp member, adapted to engage the actuating lever, and retain the lever in the open, full flow position so that the dispensing attendant would be free to perform other activities during tank fill. As the nozzle apparatus typically includes an automatic shut-off feature, fill of the tank would be sensed and flow halted, despite the fact that the attendant was not manually controlling the flow.

With the advent of self-service facilities, however, the use of such clamp mechanisms has been substantially eliminated. Accordingly, the motorist attending to the filling of his automotive gasoline tank is required to maintain his or her grip on the nozzle apparatus and actuating lever throughout the filling procedure. This often requires the owner to crouch, stoop or otherwise maintain an uncomfortable or awkward position, and further may lead to substantial uncomfort to the hand and fingers, especially upon maintaining the grip position for an extended period of time and in adverse weather conditions.

It is thus the purpose of the present invention to provide a device which may be utilized in conjunction with the dispensation of gasoline and similar fluids to allow the release of the operator's hand from the trigger mechanism during the dispensation process and permit automatic flow of the fuel.

Yet another purpose of the present invention is to provide such a device in a form which is easy and convenient to use and which may be simply and economically manufactured.

Still another purpose of the present invention is to provide such a device which may be inserted and removed by the user.

A further purpose of the invention is to provide such an insertable device which does not otherwise affect the operation of the pump assembly.

BRIEF DESCRIPTION OF THE INVENTION

In accordance with the above and other purposes and objects, the present invention comprises a spherical assembly formed of a rubber or similar tough but slightly deformable material having a diameter small enough to allow it to be placed between the actuating lever and frame, preferably when the lever is in the fully raised, full-flow position, yet having a diameter sufficiently large to maintain the lever in a flow position when the handle is released and rests against the unit. The surface of the ball may be provided with a plurality of projections to facilitate the gripping thereof. When dispensing is completed, lifting of the lever upwardly from the unit allows the device to be removed, the actuating lever then returning to the normal off position.

DESCRIPTION OF THE DRAWINGS

A fuller understanding of the present invention will be apparent upon consideration of the following description of a preferred embodiment thereof when reviewed in connection with the annexed drawings, wherein.

DETAILED DESCRIPTION OF A PREFERRED EMBODIMENT

Figure 1:
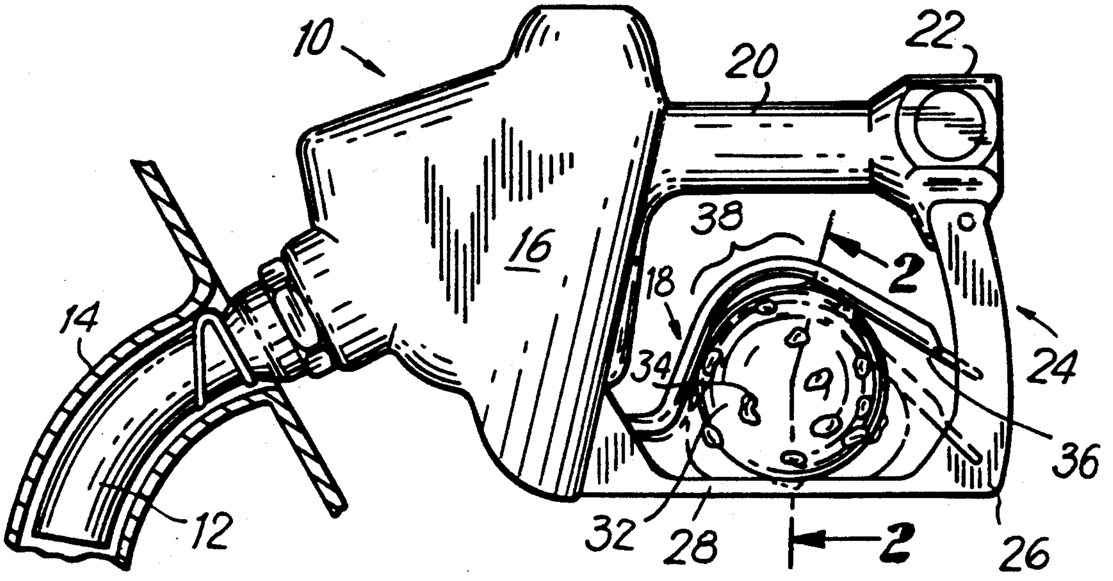
FIG. 1 is a view of the present invention installed upon a gasoline dispenser nozzle.

As shown in the Figures, typical gasoline pump nozzle assembly 10 includes the nozzle proper 12 adapted to be insertable into the automobile filler pipe 14. The nozzle 12 extends from the main body 16 of the assembly which includes appropriate sensor and valving to allow the dispensation of the gasoline upon actuation of the nozzle handle 18.

Figure 2:
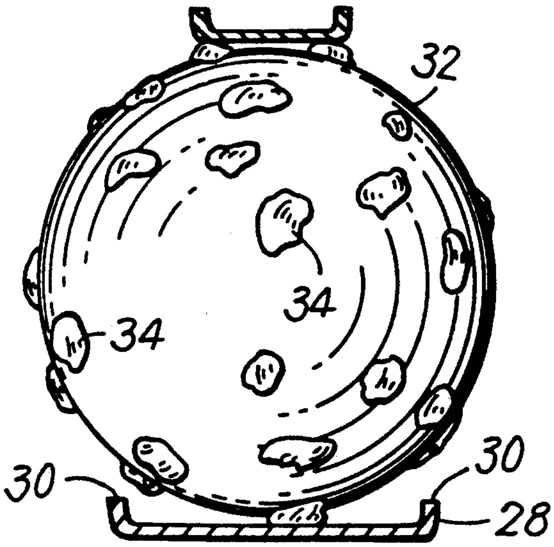
FIG. 2 is a partial section view taken along line 2—2 of FIG. 1 further depicting the positioning of the invention within the filler apparatus.

The nozzle assembly 10 further includes an integral entrance pip portion 20 which leads to the main body 16 and an internal valve which terminates at its other end in a fitting 22 to which an appropriate hose (not shown) is connected to the main metering system of the pump. The pipe and fitting combination form the upper member of generally rectangular frame 24 which surrounds the actuating lever 18. The frame 24 further includes a generally L-shaped combination lower and side guard element 26 which projects from the lower end of the nozzle body 16 and is affixed to the pipe fitting 22. As seen in FIG. 2, the horizontally-extending portion 28 of guard element 26 may be of a generally flat cross-section, having a pair of upturned lateral edges 30.

As is known in the art, upward travel of the actuating lever 18, typically occurring upon a gripping of the lever and entrance pipe portion 20 of the nozzle assembly by the user's hand, opens the internal valving to allow the flow of gasoline into the filler pipe 14 and the gasoline storage tank of the vehicle. The internal sensors (not shown) sense when fill of the tank occurs, causing automatic shut-off of the nozzle to prevent overfilling and spillage of the flammable liquid. The shut off occurs irrespective of the position of the actuating lever.

The present invention comprises a ball or sphere 32, preferably of solid construction, formed of a natural or synthetic rubber composition chosen to be resistant to gasoline and similar liquids which would normally be pumped through the nozzle assembly 10 and which are subject to splash-back about the nozzle and which are otherwise generally present about the nozzle. The ball may be molded with raised surface ornamentations 34 appearing randomly across its outer surface. A preferred diameter for the ball is about $2\frac{1}{2}$ inches. Because of the elastomeric construction of the ball, it may be compressed from about $\frac{1}{8}$–$\frac{1}{2}$ inches.

The diameter of the ball is such that it may be inserted into the area 36 between the handle 18 and the lower, horizontal portion 28 of the guard element 26 when the handle 18 is in the fully raised position. With such insertion, the handle is released and assumes the position as shown in the figures, which is above the fully lowered, off position depicted in phantom in FIG. 1. In this position, the ball 32 is supported by the horizontal guard element portion 30 and the concave loop portion 38 of the actuating lever.

With the actuating lever maintained in a raised, flow-allowing position, the gas tank of the vehicle is filled without the necessity for the operator to maintain a grip on the lever 18. When the filling process is completed, the automatic shut-off is engaged, terminating tank fill notwithstanding the fact that the handle 18 is still in a raised, fill orientation. At that point the ball 32 may be easily removed from the nozzle by raising the lever slightly. the valve remains off thus preventing overfill. The handle is then allowed to return to the lower, off position, at which time the nozzle assembly may be returned to storage.

I claim:

1. Apparatus for controlling the dispensation of a fluid, comprising a fluid inlet pipe; manually-operable valve means connected to said inlet pipe and having an outlet nozzle for fluid dispensing, said valve means comprising a body, a pivotable actuating lever extending from said body, and a generally-rectangular guard assembly extending from said body and surrounding said lever, said lever having a first operating position corresponding to valve shut-off wherein said lever is proximate said frame and a second operative position corresponding to valve opening wherein said lever is displaced from said frame; and a spherical element having a diameter chosen to allow said spherical element to be inserted between said lever and said guard whereby said lever is in said second position whereby said handle is maintained in said second position without continued manual contact with said lever.

2. The apparatus of claim 1, wherein the surface of said spherical element includes a plurality of projections.

3. The apparatus of claim 1, wherein said spherical element is formed of rubber.

4. A method for maintaining the flow through a fluid dispenser of the type having a manually operable valve means comprising a pivotable lever surrounded by a guard assembly, comprising the steps of manually initiating flow through said nozzle assembly by raising the lever to a flow-initiating position displaced from the guard;

inserting a spherical element having a resilient surface bearing a plurality of projections thereon between said lever and guard to maintain said lever in said flow-initiating position; and releasing manual contact with said lever.

* * * * *